United States Patent [19]

Depiano et al.

[11] Patent Number: 4,944,094

[45] Date of Patent: Jul. 31, 1990

[54] PICTURE FRAME LEVELING TOOL

[76] Inventors: Joseph G. Depiano; Linda S. Schmidt, both of 4320 Deyo, Brookfield, Ill. 60513

[21] Appl. No.: 406,030

[22] Filed: Sep. 11, 1989

[51] Int. Cl.⁵ ................................................ G01C 9/28
[52] U.S. Cl. ....................................... 33/371; 33/382; 33/332
[58] Field of Search ................. 33/305, 332, 334, 344, 33/346, 347, 350, 370–379, 381, 382, 389, 395, 396, 410, 427, 451

[56] References Cited

U.S. PATENT DOCUMENTS

| | | | |
|---|---|---|---|
| 1,612,843 | 1/1927 | Timmis | 33/371 |
| 2,667,704 | 2/1954 | Dunn | 33/374 |
| 2,906,031 | 9/1959 | Rice | 33/382 |
| 3,435,533 | 4/1969 | Whitfield | 33/375 |
| 3,524,259 | 8/1970 | Handley | 33/382 |
| 3,820,249 | 6/1974 | Stone | 33/382 |
| 4,100,681 | 7/1978 | Hollander | 33/347 |
| 4,208,802 | 6/1980 | Berndt | 33/371 |
| 4,473,957 | 10/1984 | Faulkner | 33/666 |
| 4,531,301 | 7/1985 | Tan | 33/382 |

Primary Examiner—William A. Cuchlinski, Jr.
Assistant Examiner—D. DePumpo
Attorney, Agent, or Firm—Leon Gilden

[57] ABSTRACT

A picture frame leveling tool includes an elongate, generally "L" shaped body formed with a horizontal and vertical defined leg defining a notch within the legs to accept a picture frame therewithin. Upper and lower visual level indicators enable alignment of the picture frame relative to a support wall surface. The organization optionally includes a friction cushion layer laminated to an interior surface of the horizontal leg to provide enhanced frictional engagement with the picture frame, and may further include capturing brackets slidably mounted to a rear vertical surface of the horizontal leg of the body to secure a picture frame within the notch during a leveling procedure.

5 Claims, 5 Drawing Sheets

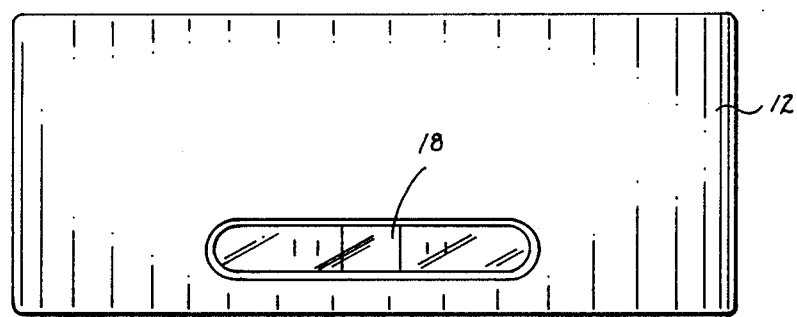
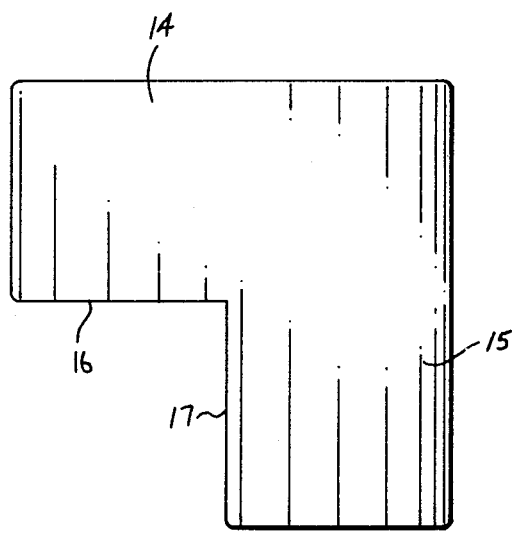

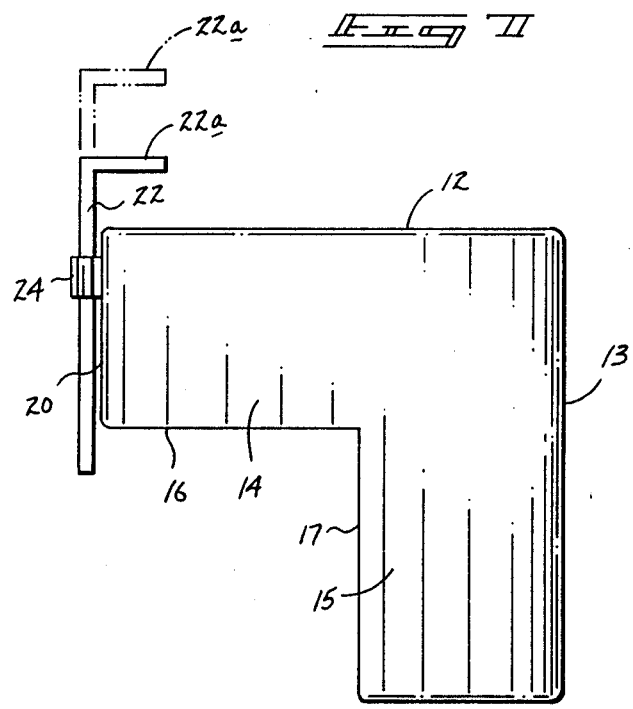
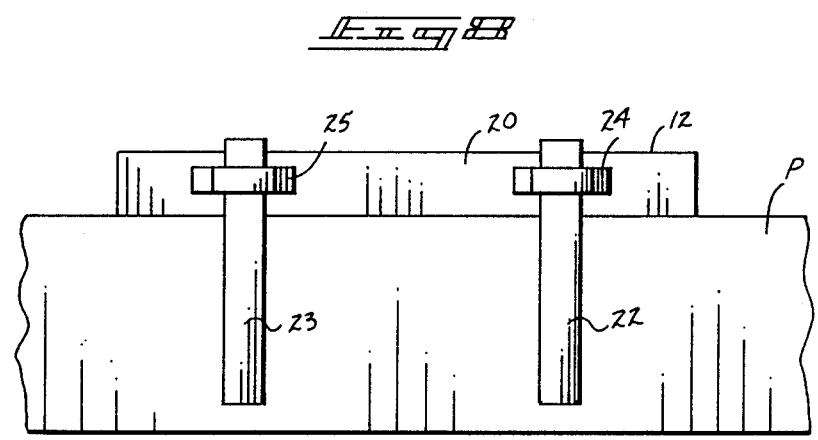

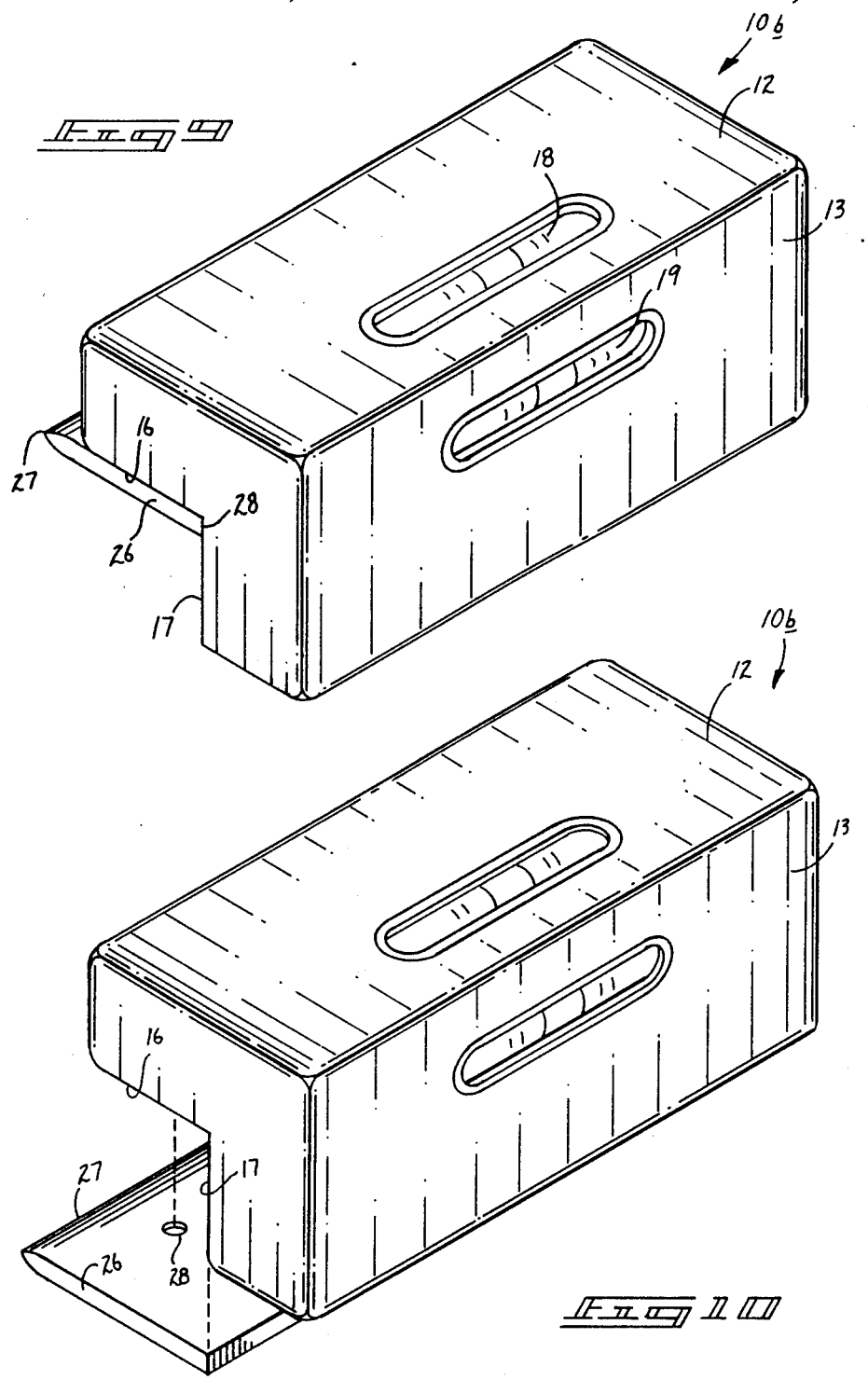

PICTURE FRAME LEVELING TOOL

BACKGROUND OF THE INVENTION

1. Field of the Invention

The field of invention relates to leveling tools, and more particularly pertains to a new and improved picture frame leveling tool wherein the same provides a notched, elongate recess for accepting a picture frame therewithin to assist in positioning the tool against a support wall surface.

2. Description of the Prior Art

The use of leveling tools for various purposes has been notoriously well known in the prior art. Leveling tools of the prior art, however, have been of a generally generic nature in their application to leveling needs, whereas the instant invention provides a specific leveling tool formed to accommodate a picture frame to enhance a leveling procedure when securing a picture frame to a support wall surface. Examples of the prior art include U.S Pat. No. 4,531,301 to Tau sets forth an "L" shaped level formed with a series of apertures and bubble levels therewithin, but fails to provide &he frictional gripping surface and clamping members of the instant invention to secure a picture frame therewithin.

U.S. Pat. No. 3,820,249 to Stone sets forth a leveling apparatus formed with pivoted plate members mounted together formed with magnetic strips for securement of the level to an associated workpiece.

U.S. Pat. No. 3,435,538 to Whitefield sets forth a level formed with reciprocating members slidably mounted within the level for securement of edge portions of workpieces to enhance securement of the level relative to the workpiece.

U.S. Pat. No. 2,906,03 to Rice provides a leveling instrument formed with spaced level portions defining a generally "Z" shaped configuration in cross-section to position the level relative to masonry wall constructions.

As such, it may be appreciated that there is a continuing need for a new and improved picture frame leveling tool wherein the same is provided with a leveling instrument formed with a plurality&y of legs, each leg including a horizontally aligned level indicate therewithin.

SUMMARY OF THE INVENTION

In view of the foregoing disadvantages inherent in the known types of leveling tools now present in the prior art, the present invention provides a picture frame leveling tool provided with a plurality of orthogonally oriented legs defining an elongate 90 degree notch therewithin to receive a picture frame therewithin. The tool includes an upper and forward surface, each including a horizontally aligned level to enable orientation of the level portions relative to an associated picture frame. The tool includes a friction gripping surface formed of a resilient polymeric material positioned along a horizontal interior surface of an upper leg of the tool and further includes optional reciprocatable clamping braces to capture an associated picture frame between the braces and an interior surface of the vertical leg of the tool. Further, a blade member is mounted selectively to the interior surface of the horizontal leg to enable imparting of an indicator mark to enable visual reference of the horizontal reference for securement of the associated picture frame in that same horizontal orientation.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved picture frame level tool which has all the advantages of the prior art leveling tools and none of the disadvantages.

It is another object of the present invention to provide a new and improved picture frame leveling tool which may be easily and efficiently manufactured and marketed.

It is a further object of the present invention to provide a new and improved picture frame leveling tool which is of a durable and reliable construction.

An even further object of the present invention is to provide a new and improved picture frame leveling tool which is susceptible of a low cost of manufacture with regard to both materials and labor, and which accordingly is then susceptible of low prices of sale to the consuming public, thereby making such picture frame leveling tools economically available to the buying public.

Still yet another object of the present invention is to provide a new and improved picture frame leveling tool which provides in the apparatuses and methods of the prior art some of the advantages thereof, while simultaneously overcoming some of the disadvantages normally associated therewith.

Still another object of the present invention is to provide a new and improved picture frame leveling tool wherein the same is arranged for acceptance of a picture frame within an elongate notch of the tool to orient a picture frame in a horizontal orientation relative to an associated support wall surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top orthographic view of the instant invention.

FIG. 4 is an orthographic side view taken in elevation of the instant invention.

FIG. 7 is an orthographic side view taken in elevation of the further embodiment of the instant invention.

FIG. 8 is an orthographic rear view taken in elevation of the embodiment of FIG. 6 in association with a picture frame.

FIG. 9 is an isometric illustration of a yet further embodiment of the instant invention.

FIG. 10 is an exploded isometric illustration of a yet further embodiment of the instant invention.

DESCRIPTION OF THE PREFERRED EMBODIMENT

Figure 1:
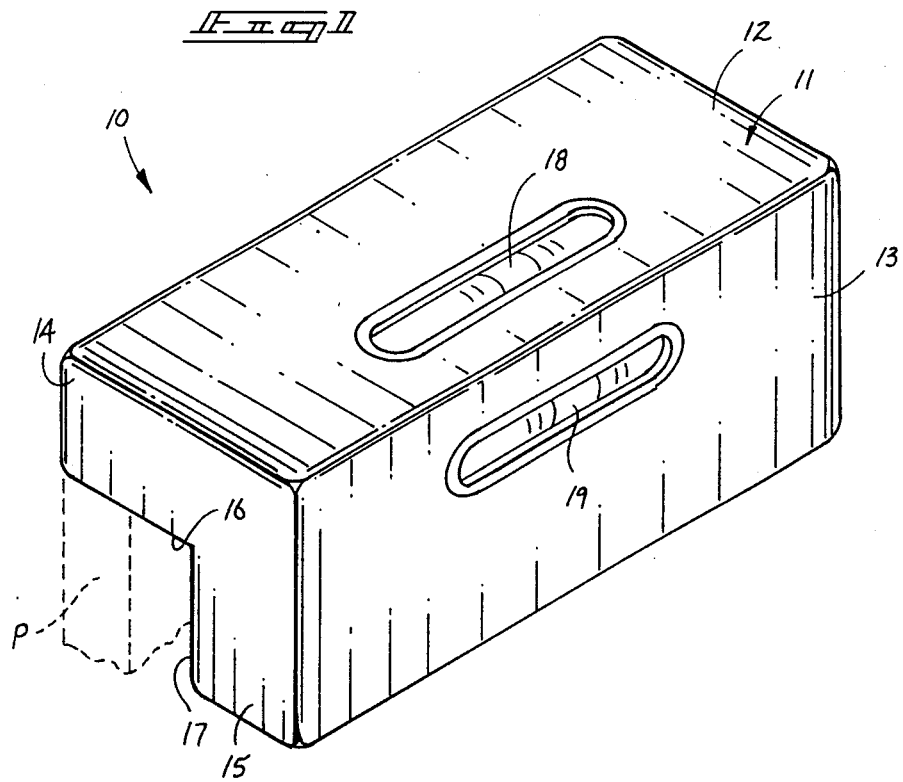
FIG. 1 is an isometric illustration of the instant invention.
Figure 2:
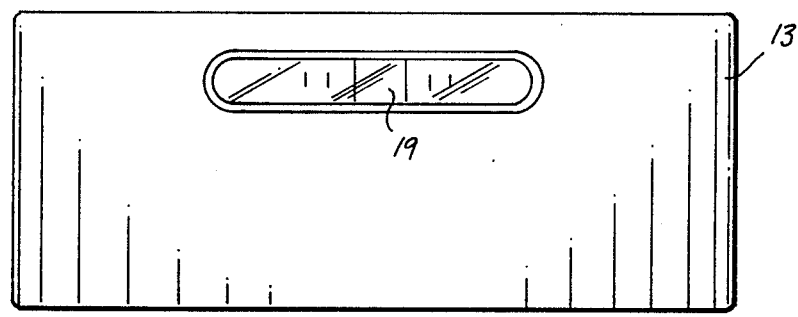
FIG. 2 is a frontal orthographic view taken in elevation of the instant invention.
Figure 5:
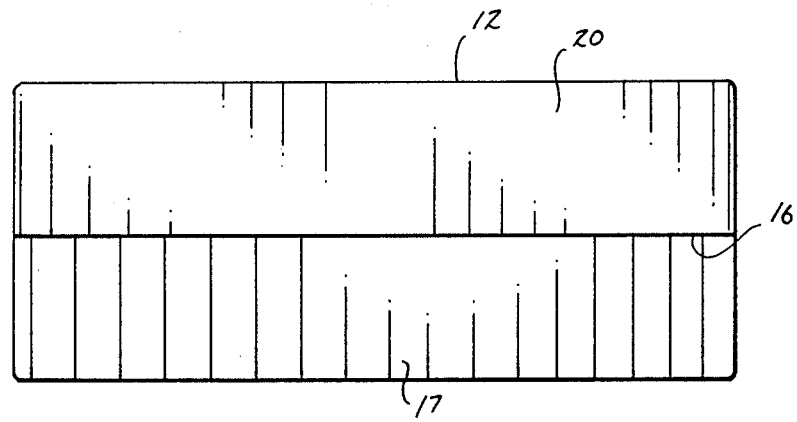
FIG. 5 is an orthographic rear view taken in elevation of the instant invention.

With reference now to the drawings, and in particular to FIGS. 1 to 10 thereof, a new and improved picture frame leveling tool embodying the principles and concepts of the present invention and generally designated by the reference numerals 10, 10a, and 10b will be described.

More specifically, the picture frame leveling tool 10 of the instant invention essentially comprises an elongate body of a generally "L" shaped cross-sectional configuration including an exterior horizontal surface 12 and an exterior vertical surface 13 of respective horizontal leg 14 and vertical leg 15. It should be noted that the first and second legs are of an equal cross-sectional thickness. The horizontal leg 14 defines an interior horizontal surface 16, wherein the vertical leg 15 conversely defines an interior vertical surface 17 merging at an intersection therewithin at a 90 degree angle to define an elongate notch coextensive with an interior surface of the leveling tool 10. The exterior horizontal surface 12 includes a first visual level indicator 18 oriented in a parallel relationship relative to forward and rear edges of the horizontal surface 12 with a second visual level indicator 19 arranged longitudinally of the exterior vertical surface 13 and parallel to the upper and lower edges of the surface 13. To enable visual alignment of an associated picture frame "P" positioned within the elongate notch defined within the interior surface of the elongate body 11, as illustrated in FIG. 1, wherein the horizontal leg's rear surface portion 20 is positioned adjacent a vertical wall surface.

Figure 6:
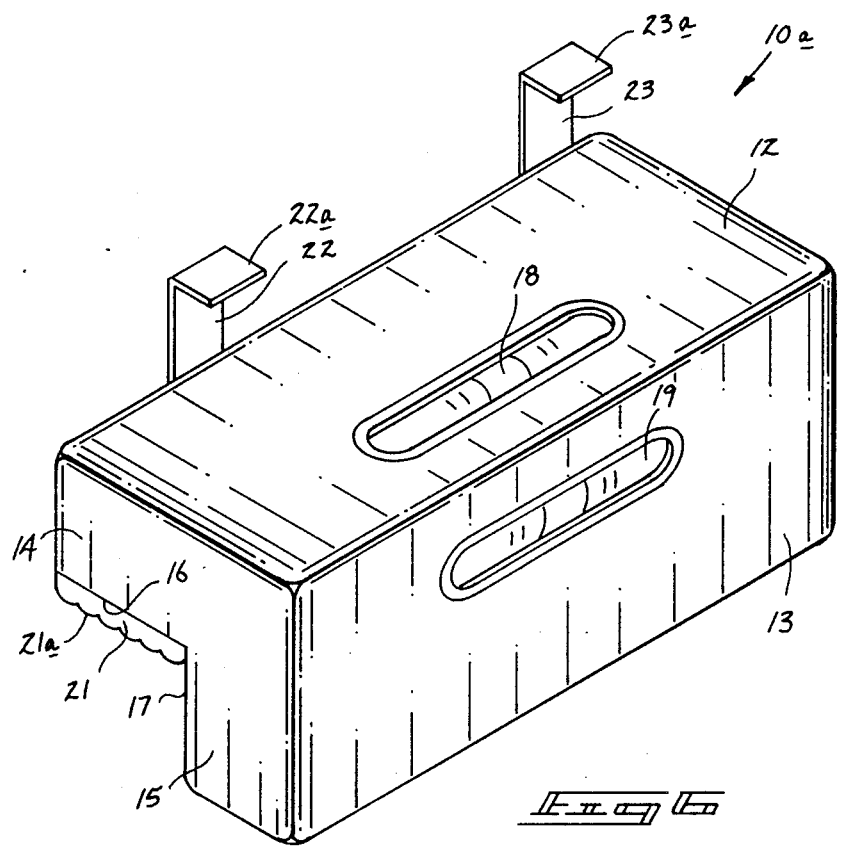
FIG. 6 is an isometric illustration of a further embodiment of the instant invention.

FIG. 6 illustrates a further embodiment of the instant invention wherein a selectively mountable resilient cushion layer 21 formed with an undulating surface 21a is selectively mounted to the interior horizontal surface 16 of the horizontal leg 14 to enhance frictional engagement of the horizontal leg 14 in association with the aforenoted picture frame "P". Furthermore, first and second respective "L" shaped latch plates 22 and 23 each formed with a respective first and second grasp handle 22a and 23a respectively are secured to the rear surface portion 20 of the horizontal leg by first and second guide loops 24 and 25 (see FIG. 8) to capture an associated picture frame "P" between the first and second latch plates 22 and 28 and the interior vertical surface 17 of the vertical leg 15.

FIGS. 9 and 10 illustrate a yet further embodiment of the instant invention wherein a marking blade 26 replaces the cushion layer 21 utilizing conventional apertures and mounting hardware, such as screws and the like (not shown), to secure the marking plate 26 against the interior horizontal surface 16 with the rear planar blade surface 26a in abutment against the interior vertical surface 17 of the vertical leg 15. The marking blade 26 is defined by elongate edge 27 coextensive with and parallel to the interior vertical surface 17, as well as the rear surface portion 20 of the horizontal leg 14, wherein the marking blade 26 is also of a length greater than the length defined by the interior horizontal surface 16 to assure the projection of the elongate edge 27 exteriorly of the rear surface portion 20 of the horizontal leg 14. This enables a picture frame "P" to be accommodated within the aforenoted notch defined between the horizontal and vertical legs 14 and 15 respectively, and thereafter imparting the elongate edge 27 onto an associated wall support surface to impose a horizontal indicator groove within the wall surface for reference for subsequent positioning of picture frames onto that wall surface and thereby avoid subsequent use of the leveling tool 10.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to on skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of United States is as follows:

1. A picture frame leveling tool for positioning a picture frame in an aligned orientation relative to a vertical support surface, wherein the tool comprises, a first elongate leg integrally and orthogonally mounted to a second elongate leg at a 90 degree apex to define an elongate "L" shaped body, wherein the first leg includes an exterior horizontal surface and the second leg includes an exterior vertical surface, wherein each exterior surface includes a visual indicator longitudinally aligned with each respective leg, the first leg includes an interior horizontal surface with a rear wall surface orthogonally joined to the respective exterior horizontal surface and the interior horizontal surface, and the second leg includes an interior vertical surface orthogonally intersecting the interior horizontal surface, and the first and second legs of an equal thickness, and wherein the interior horizontal surface is defined by a predetermined width and further including a selectively mountable resilient cushion layer of a polymeric material of a width equal to the predetermined width selectively mounted to the interior horizontal surface to provide an enhanced friction engaging surface for the picture frame, and further including a first and second latch plate member reciprocatably mounted to the rear wall surface, each latch plate member defined by a respective first and second plate member slidably mounted relative to the rear wall surface, and wherein the first and second latch plate includes a respective first and second grasp handle orthogonally secured to the respective first and second latch plate and directed overlying the exterior horizontal surface of the first leg, and wherein the first and second latch plates further include a respective first and second guide loop, wherein each guide loop is mounted to the rear wall surface and aligned longitudinally with the rear wall surface to slidingly receive the respective first and second latch plates orthogonally relative to the rear wall surface.

2. A picture frame leveling tool as set forth in claim 1 wherein each first and second latch plate is defined by a predetermined length greater than a rear wall length defined by the rear wall surface.

3. A picture frame leveling tool as set forth in claim 2 further including a marking blade, the marking blade selectively mounted to the interior horizontal surface of the first leg.

4. A picture frame leveling tool as set forth in claim 3 wherein the marking blade is defined by a marking blade width greater than the predetermined width of the interior horizontal surface of the first leg, and the marking blade including an elongate edge aligned generally parallel to the rear wall surface and extending beyond the rear wall surface when the marking blade is secured to the interior horizontal surface.

5. A picture frame leveling tool as set forth in claim 4 wherein the elongate blade includes a planar rear blade surface positioned in abutment with the interior vertical surface when the marking blade is secured to the interior horizontal surface to provide support for the marking blade.

* * * * *